United States Patent [19]

Huetsch

[11] Patent Number: 5,542,647
[45] Date of Patent: Aug. 6, 1996

[54] TWO-SPEED JACK

[76] Inventor: Larry C. Huetsch, 7124 Sentinel Rd., Rockford, Ill. 61107

[21] Appl. No.: 406,585

[22] Filed: Mar. 20, 1995

[51] Int. Cl.$^6$ ........................................................ B60S 9/02
[52] U.S. Cl. ............................ 254/420; 254/425; 254/103
[58] Field of Search ..................................... 475/326, 325; 74/342; 254/420, 419, 426, 103; 280/475, 763.1, 762, 766.1

[56] References Cited

U.S. PATENT DOCUMENTS

| | | |
|---|---|---|
| 2,464,890 | 3/1949 | Premo . |
| 2,674,438 | 4/1954 | Dalton . |
| 2,747,422 | 5/1956 | Walther . |
| 3,632,086 | 1/1972 | Mai . |
| 3,861,648 | 1/1975 | Glassmeyer . |
| 3,892,141 | 7/1975 | Phillips, Jr. et al. . |
| 4,187,733 | 2/1980 | Walther et al. . |
| 5,199,738 | 4/1993 | VanDenberg . |

*Primary Examiner*—Robert C. Watson
*Attorney, Agent, or Firm*—Vernon J. Pillote

[57] ABSTRACT

A jack of the type having inner and outer legs and a screw for extending and retracting the inner leg relative to the outer leg. The screw is mounted on a base fixed to the outer leg for rotating and limited endwise movement between the upper and lower positions relative to the base such that the screw and inner leg can move downwardly to the lower position when the inner leg is out of ground engagement and the inner leg moves the screw toward the upper position when the leg engages the ground. A rotary drive member is mounted for rotation relative to the base about the axis of the screw and a transmission mechanism responsive to rotation of the drive member drives the screw at a high speed ratio when the screw is in the lower position and at a low speed ratio when the screw is in the upper position.

19 Claims, 3 Drawing Sheets

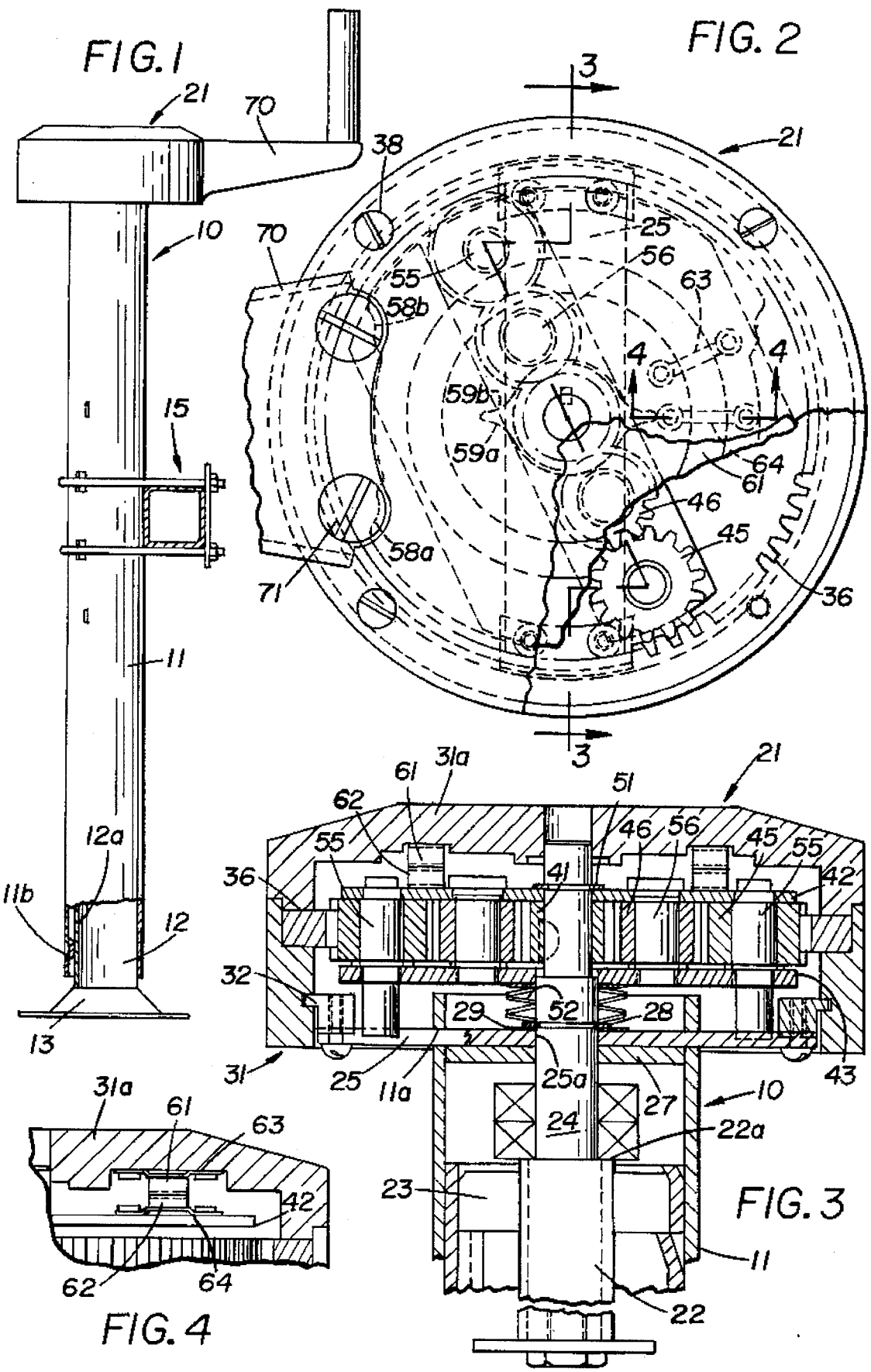

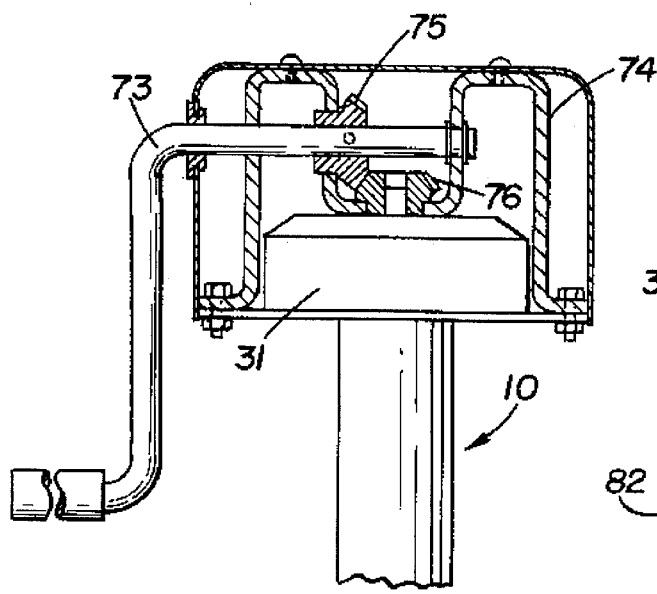
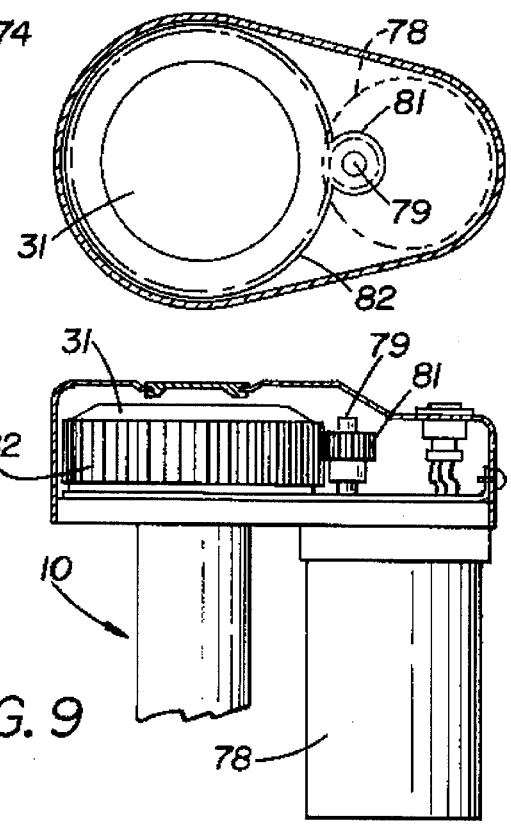
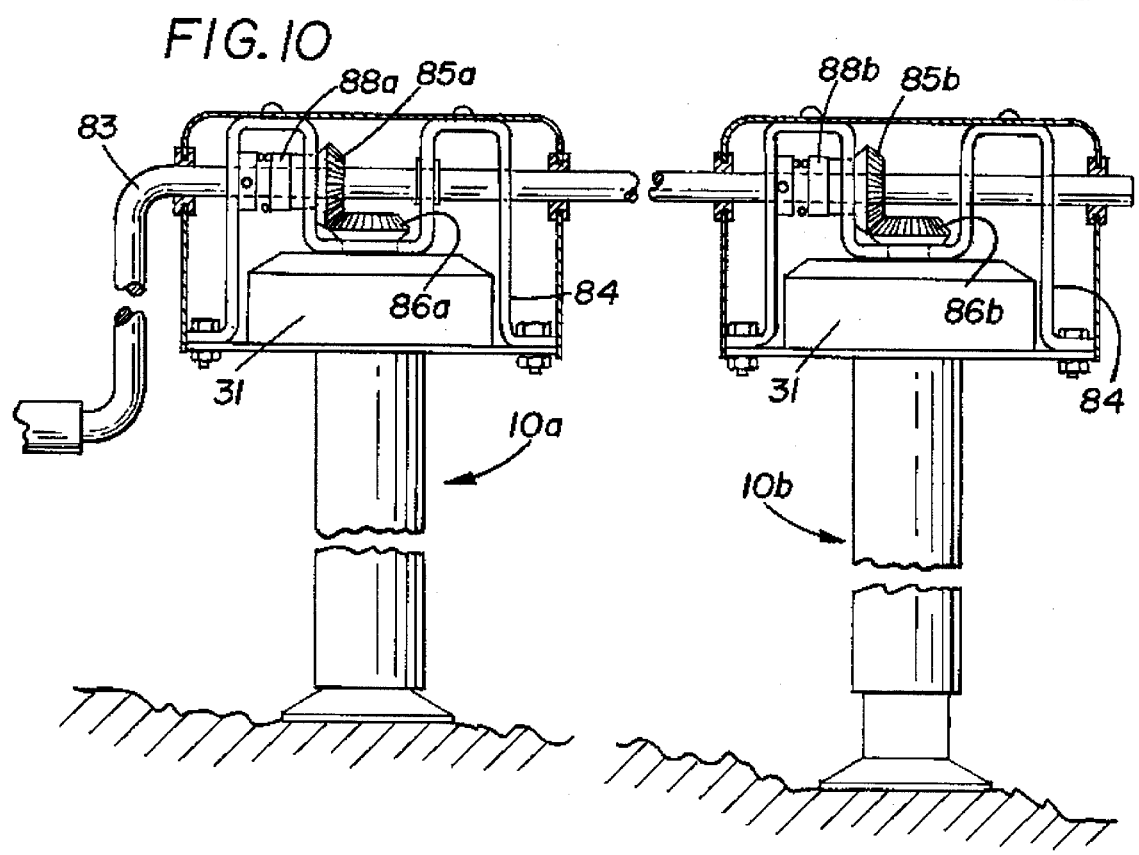

TWO-SPEED JACK

BACKGROUND OF THE INVENTION

It is known, for example as disclosed in U.S. Pat. Nos. 2,464,890; 2,747,422; 3,632,086; 3,861,648; 3,892,141; 4,187,733 and 5,199,738, to provide two-speed jacks and/or landing gears for trailers and the like, which enable lowering of the ground engaging leg at a high gear ratio to a position adjacent the ground, and to thereafter lower the ground engaging leg at a low gear ratio providing high torque for raising the trailer to a desired support position. The two-speed jacks in the above patents, however, require the input drive to be stopped and then manually shifted from the high gear ratio to the low gear ratio drive during lowering of the ground engaging leg and similarly stopped and manually lifted from the low gear ratio drive to the high gear ratio drive during raising of the ground engaging leg.

It has also been proposed as shown in U.S. Pat. No. 2,674,438, to provide a jack having two jack screws of different pitch, with one jack screw for extending and retracting one section of the support leg at a high speed and a second jack screw for extending and retracting a second section of the support leg at a lower speed. The two jack screws are disposed in axially aligned relation and the distance through which the ground engaging leg can be extended at high speed is limited by the length of the high speed screw and the distance at which the leg can be extended at low speed, high torque is limited by the length of the low speed screw.

SUMMARY OF THE INVENTION

It is an object of the present invention to provide a two-speed jack having a screw drive that is operative to lower the ground supporting leg at a high speed when the leg is out of ground engagement and then automatically shift to drive the screw at the low speed when the leg engages the ground.

Other objects of the present invention are to provide a two-speed jack in accordance with the foregoing object, which is economical to produce and easy to operate.

Accordingly, the present invention provides an improved two-speed screw drive mechanism for a jack of the type having an outer leg, an inner leg slidable in the outer leg with a screw follower on the upper end and ground engaging means at a lower end, and a screw having a threaded shaft engaging the screw follower for extending the inner leg when the screw is rotated in one direction and for retracting the inner leg when the screw is rotated in a second direction. The screw drive mechanism includes a base fixed to the upper end of the outer leg and a means mounting an upper end of the screw on the base for axial rotation and for limited endwise movement of the screw relative to the base between upper and lower positions such that the screw and inner leg move downwardly relative to the outer leg to the lower position when the leg is out of ground engagement and the inner leg moves the screw toward the upper position when the leg engages the ground. A rotary drive means is mounted for rotation relative to the base and transmission means responsive to rotation of the rotary drive means is operative when the screw is in the lower position for driving the screw a preselected number of revolutions for each revolution of the rotary drive means and operative when the screw is in the upper position for driving the screw at a lower number of revolutions for each revolution of the rotary drive.

In a preferred embodiment, the rotary drive includes a drive member mounted on the base for rotation about the axis of the screw, a ring gear rotatable with the drive member, a sun gear rotatable with the screw, gear carrier means mounted for turning about the axis of the screw, and intermediate gears mounted for rotation on the gear carrier means. A mechanism is provided for stopping the turning of the gear carrier relative to the base when the screw is in its lower position to drive the screw at a high gear ratio, and mechanism provided for turning the gear carrier with the drive member when the screw is in its upper position, to drive the screw at a low gear ratio.

BRIEF DESCRIPTION OF THE DRAWINGS

FIG. 1 is a side elevational view of a two-speed jack embodying the present invention;

FIG. 2 is a top view of the jack with parts shown in phantom and parts broken away to illustrate the construction;

FIG. 3 is a vertical sectional view taken on the plane 3—3 of FIG. 2, and illustrating the drive mechanism in a high speed drive condition;

FIG. 4 is a fragmentary view taken on the plane 4—4 of FIG. 2, illustrating parts on a larger scale than in FIG. 2;

FIG. 7 is a fragmentary view illustrating the two-speed jack with a crank drive mounted for rotation about a horizontal axis;

FIG. 8 is a top view of a two-speed jack with a motor drive;

FIG. 9 is a side view of the two-speed jack with the motor drive of FIG. 8, with parts of the casing built in a way to illustrate details of construction, and FIG. 10 is a side view of a dual jack system having a pair of two-speed jacks and a common crank drive for the jacks.

DETAILED DESCRIPTION

Figure 5:
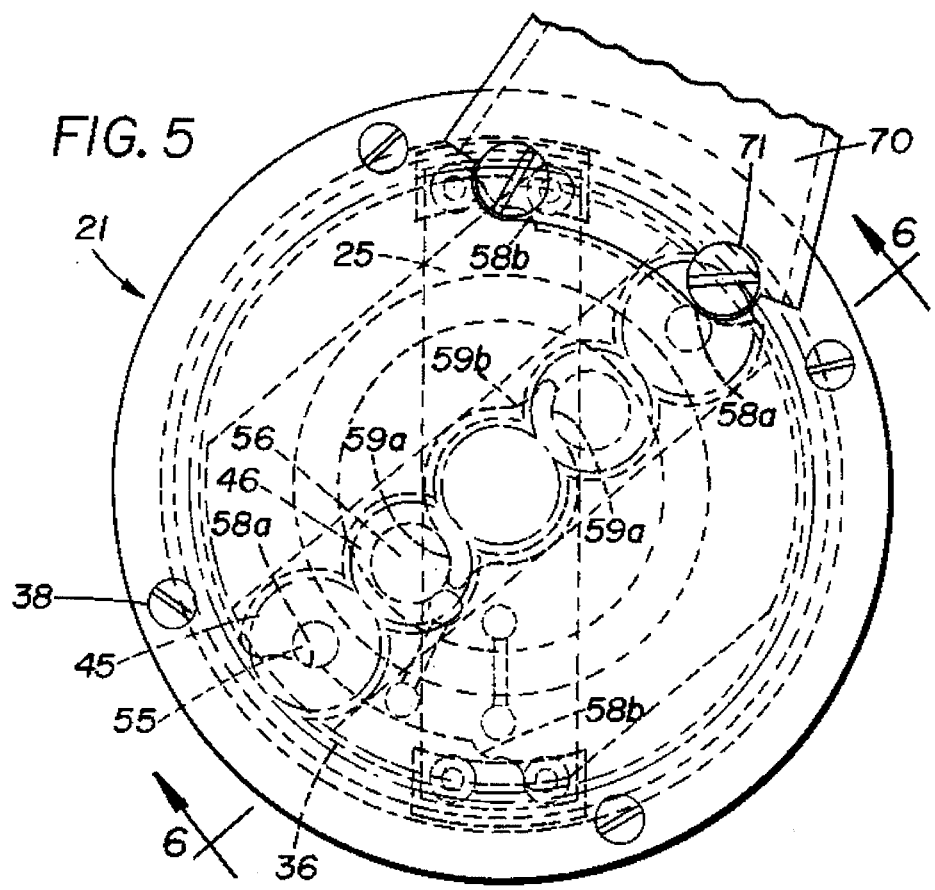
FIG. 5 is a top view of the jack illustrating parts in a low speed drive condition.

As shown in FIG. 1, the jack designated generally by the numeral 10 includes a tubular outer leg 11, a tubular inner leg 12 telescopically slidable in the outer leg and having ground engaging means 13 at a lower end. The ground engaging means may be of any conventional type and may, for example, comprise a foot as shown or a wheel or caster. A means such as indicated generally by the numeral 15, is provided for mounting the jack on a body such as on a tongue of a trailer. The inner leg is slidably and non-rotatably supported in the outer leg and, as is conventional, the inner leg has a lengthwise extending groove or recess 12a in its outer surface that slidably receives a protrusion such as indicated at 11b on the outer sleeve, to hold the inner sleeve against rotation during extension and retraction. A drive head 21, to be described more fully hereinafter, is provided at the upper end of the outer leg.

Figure 6:
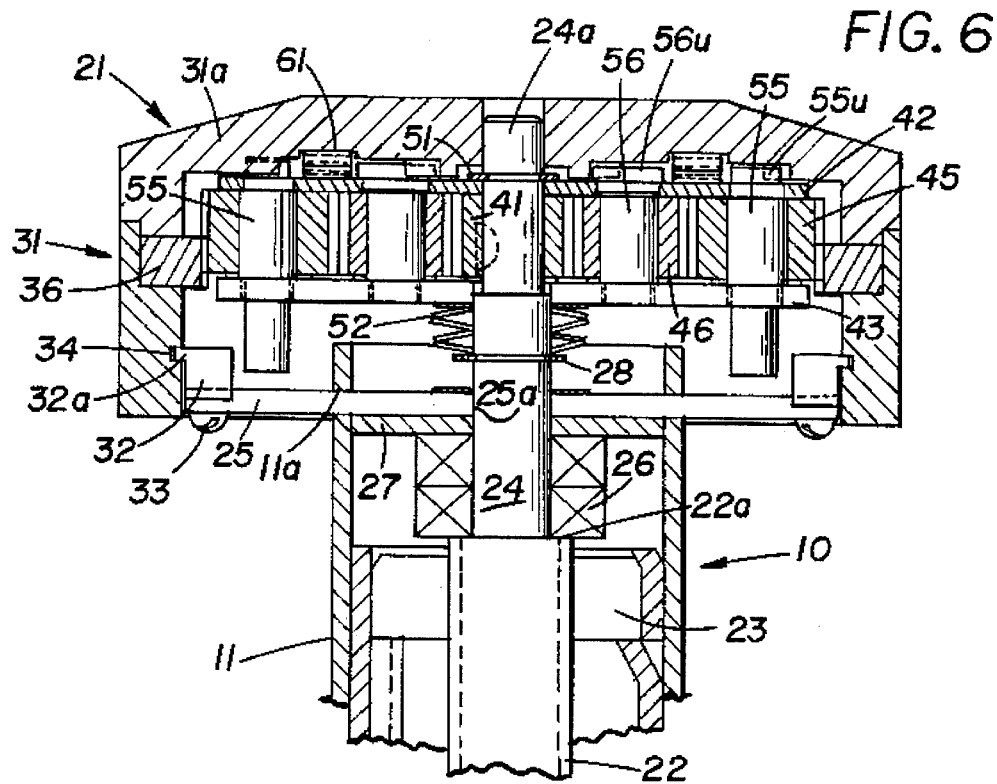
FIG. 6 is a sectional view taken on the plane 6—6 of FIG. 5 and illustrating parts in a low speed drive condition.

As best shown in FIGS. 3 and 6, a screw having a threaded shank 22 is disposed coaxial with the inner leg and threadedly engages a screw follower 23 fixed to the upper end of the inner leg. The screw follower is nonslidably and non-rotatably mounted on the upper end of the inner leg and the screw has a shank 24 extending upwardly from the threaded shaft 22.

The drive head 21 includes a base 25 fixed to the upper end of the outer leg 11 and having an opening 25a that slidably and rotatably receives the shank 24 on the screw shaft 22. The base 25 can conveniently be in the form of a strap that is slidable through openings 11a in the tubular outer leg 11, prior to insertion of the shank into the opening 25a. Thrust bearings 26 are disposed on the shank 24 and engage a shoulder 22a at the upper end of the threaded shaft 22 and are arranged to engage a thrust plate 27 disposed in the outer leg 11 at the underside of the base 25. A retaining ring 28 is mounted in a groove in the shank 24 at a location above the base and engages a thrust washer 29, to limit downward movement of the screw to a preselected lower position relative to the base as shown in FIG. 3. The spacing of the retaining ring 28 from the shoulder 22a is selected such that the thrust washers are spaced a preselected distance from the bearing plate when the screw is in its lower position as shown in FIG. 3, and the thrust bearings 26 are arranged to engage the bearing plate 27 to limit upward movement of the screw to a preselected upper position as shown in FIG. 6. When the jack is mounted vertically, the weight of the screw and the inner tube 11 will normally gravitationally urge the screw downwardly relative to the lower position relative to the base. However, if the jack is not mounted vertically or if the weight of the screw and inner tube is not sufficient, a means such as a compression spring (not shown) can be provided between the base and the upper end of the inner tube 11, to aid in moving the screw and inner tube to its lower position relative to the base.

In the preferred embodiment illustrated, the screw drive head 21 includes a rotary drive member 31 mounted for rotation relative to the base about the axis of the screw. As best shown in FIGS. 3 and 6, the drive member is mounted on the base by members 32 secured to the base by fasteners 33. The members 32 have outwardly directed flanges 32a that extend into a recess 34 in the cover. A two-speed transmission means is provided for driving the screw in response to rotation of the rotary drive member 21 and is operative when the screw is in a lower position as shown in FIG. 3, for driving the screw at a plurality of revolutions for each revolution of the rotary drive member, and is operative when the screw is the upper position to drive the screw at a lower number of revolutions for each revolution of the rotary drive member. In the preferred embodiment illustrated, the rotary drive member 31 includes drive cover 31a mounted for rotation with the rotary drive member. As shown, the drive member 31 and drive cover 37 are formed separately and secured together by fasteners 38 (FIG. 2). It is contemplated, however, that the drive member and drive cover can be formed as by molding in one piece, for economy of manufacture. The transmission means includes a ring gear 36 mounted on or formed integrally with the drive member 31; a sun gear 41 non-rotatably keyed to an extension 24a on shank 24; upper and lower gear carriers 42 and 43 mounted for turning about the axis of the screw, and intermediate gears 45, 46 mounted in pins 55 and 56 for rotation on the gear carriers 42, 43. A retaining ring 51 disposed in a groove on the shank extension 24a, limits upward movement of the gear carrier 42 relative to the screw and springs 52 disposed between the retaining ring 28 on the shank portion 24 and the lower carrier 43, yieldably urge the lower gear carrier 43 upwardly against the retaining ring 51. Gears 45 and 46 are supported for rotation on the gear carriers with gear 45 meshing with ring gear 36 and gear 46 meshing with gear 45 and with sun gear 41. This arrangement is such that rotation of the ring gear in one direction will cause rotation of the shaft in the same direction as the ring gear.

The transmission means also include means for stopping rotation of the gear carriers relative to the base, when the screw is in the lower position shown in FIG. 3. As shown, the lower ends of the drive pins 55 are arranged to engage abutments formed by opposite edges of the base plate 25, when the screw is in the lower position. Thus, when the ring gear is rotated in either direction, the ring gear will drive the sun gear through intermediate gears 45, 46, through a number of revolutions for each revolution of the ring gear. The number of revolutions of a sun gear and shaft for each revolution of the ring gear can be adjusted by appropriate selection of the sizes of the gears and in the embodiment illustrated, is about 8 to 1.

The transmission means also includes means for driving the gear carrier means with the drive member so that the sun gear rotates at the same rotational speed as the drive member. With this arrangement the sun gear is rotated to one revolution for each revolution of the drive member to provide a high torque low speed drive for the screw. For this purpose, pins 55 and 56 have upper ends that project above the upper gear carrier 42 and are arranged to engage abutments on the drive cover 31a when the screw and transmission are shifted to the raised position shown in FIGS. 5 and 6. More specifically, abutments 58a and 59a on the cover are arranged to respectively engage the upper ends of the pins 55 and 56 when the cover is rotated in a clockwise direction, and abutments 58b and 59b on the drive cover are arranged to engage the upper ends of pins 55 and 56 when the cover is rotated in a counterclockwise direction. Thus, when the screw is in its raised condition shown in FIGS. 5 and 6, the screw is rotated at the same speed and in the same direction as the cover.

A slip clutch is provided on the gear carrier and drive member for turning the gear carrier when the lower ends of the pins 55 on the gear carrier move out of engagement with stops on the base 25 and before the upper ends of pins 55 and 56 engage the abutments on the cover. In the embodiment illustrated, the slip clutch includes upper and lower wave washers 61, 62 that are respectively secured to a underside of the drive cover and to the upper gear carrier by straps 63, 64, as best shown in FIGS. 2 and 4. The wave washers are arranged to engage but slip relative to each other until the upward movement of the shaft moves the lower ends of pins 55 out of engagement with the base. Wave washers then rotate the gear carriers with the cover until the upper ends of the pins 55 and 56 engage the abutments on the cover.

In the embodiment of FIGS. 1–5, the drive member 31 is rotated by a hand crank 70 that is fixed in the cover as by fasteners 71 so that the crank is rotatable about the axis of the screw. A modified crank arrangement for rotating the drive member is illustrated in FIG. 7 and includes a crank 73 mounted in a bracket 74 for rotation about an axis transverse to the axis of the screw. A means such as bevel gears 75 and 76 are provided to drivingly connect the crank 73 to the drive member 31.

A motor drive arrangement for rotating the drive member is illustrated in FIGS. 8 and 9. As shown, an electric motor 78 having an output shaft 79 is connected by a pinion gear 81 on the motor shaft to a ring gear 82 on the outer side of the drive member 31. The ring gear 82 can conveniently be formed as by molding integrally with the drive member.

The two-speed jack is also advantageously usable in a system employing a pair of jacks 10a and 10b driven from a common crank as shown in FIG. 10. As shown, a crank 83 is rotatably supported in brackets 84 on jacks 10a and 10b and gears 85a, 86a and 85b, 86b connect the common crank to the drive members on the jacks 10*a*, 10*b*. If the surface is uneven, such as schematically illustrated in FIG. 10, the ground engaging member on one jack such as 10*a* will engage the ground before the other jack 10*b*. The first jack to engage the ground will be automatically shifted to the low speed while the other jack continues at high speed until it engages the ground and then shifts to low speed. Thereafter both jacks can be operated at low speed to raise the trailer to the desired height.

When it is thereafter desired to raise the pair of jacks, the crank is rotated in the opposite direction. The inner legs will initially be retracted at low speed until out of engagement with the ground and thereafter both will be retracted at high speed. One of the legs may reach a full retracted position before the other and, in order to facilitate full retraction of both jacks, a spring loaded one-way clutch as indicated at 88 and 88*b* is preferably included in the drives 85*a*, 86*a* and 85*b*, 86*b*, to allow rotation of the crank relative to the rotary drive member on either jack, when the crank is rotated in a direction to raise the legs and the torque load on one or the other of the drive members exceeds a preselected value.

From the foregoing it is thought that the construction and operation of the two-speed jack will be readily understood. The screw and inner leg are gravitationally urged downwardly relative to the outer leg to the lower position when the ground engaging foot 13 is out of ground engagement. When the screw is in the lower position, pins 55*a* engage stops on the base 25 and stop rotation of the gear carriers relative to the base so that the ring gear 36 drives the sun gear on the shaft through intermediate gears 45, 46 and the shaft is rotated through a number of revolutions for each revolution of the drive member. When the ground engaging means on the inner leg engages the ground downward movement of the inner leg is interrupted and continued rotation of the drive member in the same direction causes the screw to move upwardly toward its raised position until the lower ends of pins 55 move out of engagement with the base. The slip clutch formed by wave washers 61, 62 then rotates the gear carriers 45, 46 with the drive member 31 until the upper ends of pins 55, 56 engage their respective abutments 58*a*, 59*a* on the drive member 51. The drive member thereafter continues rotation of the gear carriers at the same speed as the drive member.

When the drive member is thereafter rotated in the opposite direction while the screw is in the raised condition, the drive member will rotate the gear carriers and screw shaft at the same speed and in the same direction as the drive carrier until the inner leg moves out of ground engagement and allows the screw to shift downwardly to its lower position. At that time, the transmission shifts to high speed drive and the screw is thereafter retracted at a high speed.

The embodiments of the invention in which an exclusive property or privilege is claimed are defined as follows:

1. In a jack of the type including an outer leg, an inner leg telescopically slidable in the outer leg and having screw follower means on an upper end and ground engaging means at a lower end, a screw having an upper shank and a threaded shaft engaging the screw follower means for extending the inner leg when the screw is rotated in a first direction and for retracting the inner leg when the screw is rotated in a second direction, an improved two-speed screw drive mechanism comprising:

(a) a base fixed to an upper end of the outer leg;

(b) means mounting the shank of the screw on the base for axial rotation of the screw and for limited endwise movement of the screw relative to the base between preselected upper and lower positions; the screw and the inner leg being arranged to move downwardly relative to the outer leg to the lower position when the ground engaging means is out of ground engagement and inner leg being operative to move the screw toward said upper position when the ground engaging means engages the ground;

(c) rotary drive means mounted for rotation relative to the base;

(d) transmission means responsive to rotation of the rotary drive means in one direction and:

(i) operative when the screw is in said lower position for driving the screw in said first direction at a first number of revolutions for each revolution of the rotary drive means; and (ii) operative when the screw is in said upper position for driving the screw in said first direction at a lower number of revolutions for each revolution of the rotary drive means;

(e) and means for rotating rotary drive means.

2. A jack according to claim 1 wherein the transmission means is responsive to rotation of the rotary drive means in a second direction and is:

(i) operative when the screw is in said lower position for driving the screw in said second direction at said first number of revolutions for each revolution of the rotary drive means; and (ii) operative when the screw is in said upper position for driving the screw in said second direction through said lower number of revolutions for each revolution of the rotary drive means.

3. A jack according to claim 1 wherein the transmission means is operative when the screw is in the upper position to drive the screw one revolution for each revolution of the rotary drive means.

4. A jack according to claim 1 wherein said rotary drive means includes a drive member mounted on the base for rotation about the axis of the screw and having a drive cover spaced above the base, said transmission means being disposed between the base and the drive cover wall.

5. A jack according to claim 1 wherein said rotary drive means includes a drive member mounted on the base for rotation about the axis of the screw, said transmission means including: (a) ring gear means rotatable with the drive member; (b) a sun gear rotatable with the screw; (c) gear carrier means mounted for turning about the axis of the screw; and (d) intermediate gear means mounted for rotation on the gear carrier means.

6. A jack according to claim 5 wherein the transmission means includes (a) means for stopping turning of the gear carrier means relative to the base when the screw is in said lower position and, (b) means for turning the gear carrier means with the drive member when the screw is in said upper position.

7. A jack according to claim 5 wherein the transmission means includes first abutment means on the gear carrier means engageable with the base when the screw is in said lower position for stopping turning of the gear carrier means, and second abutment on the gear carrier means engageable with the drive member when the screw is in the upper position for turning the gear carrier means with the drive member.

8. A jack according to claim 7 wherein the means for turning the gear carrier means with the drive member includes slip clutch means on the gear carrier means and the drive member for turning the gear carrier means when the first abutment means moves out of engagement with the base and before the second abutment means moves into engagement with the drive member.

9. A jack according to claim 5 including means for moving the gear carrier means downwardly relative to the base when the screw is moved downwardly from the upper position, means for moving the gear carrier means upwardly relative to the base when the screw is moved upwardly from the lower position, the transmission means including first abutment means on the gear carrier means engageable with the base when the screw is in said lower position for stopping turning of the gear carrier means, and second abutment means on the gear carrier means engageable with the drive member when the screw is in the upper position for turning the gear carrier means with the drive member.

10. A jack according to claim 5 including means for moving the gear carrier means downwardly when the screw is moved downwardly from the upper position, means for yieldably moving the gear carrier means upwardly when the screw is moved upwardly from the lower position, the transmission means including first abutment means on the gear carrier means engageable with the base when the screw is in said lower position for stopping turning of the gear carrier means, and second abutment means on the gear carrier means engageable with the drive member when the screw is in the upper position for turning the gear carrier means with the drive member, the means for turning the gear carrier means with the drive member including slip clutch means on the gear carrier means and the drive member for turning the gear carrier means when the first abutment means moves out of engagement with the base and before the second abutment means moves into engagement with the drive member.

11. A jack according to claim 4 wherein said means for rotating said rotary drive means includes a crank fixed to the drive member.

12. A jack according to claim 1 wherein said means for rotating said rotary drive means includes an input shaft mounted for rotation about an axis transverse to the screw axis and a first gear means mounted for rotation with the drive member and a second gear means mounted for rotation with the input shaft and in meshing engagement with the first gear means.

13. A jack according to claim 1 wherein said means for rotating said rotary drive means includes an electric drive motor having an output gear mounted for rotation about an axis parallel to the screw shaft and drivingly engaging gear means on the drive member.

14. In a jack of the type including a tubular outer leg, a tubular inner leg telescopically slidable in the outer leg and having screw follower means on an upper end and ground engaging means at a lower end, a screw having an upper shank and a threaded shaft engaging the screw follower means for extending the inner leg when the screw is rotated in a first direction and for retracting the inner leg when the screw is rotated in a second direction, an improved two-speed screw drive mechanism comprising:

(a) a base fixed to an upper end of the outer leg;
(b) means mounting the shank of the screw on the base for axial rotation of the screw and for limited endwise movement of the screw relative to the base between preselected upper and lower positions; the screw and the inner leg being arranged to move downwardly relative to the outer leg to the lower position when the ground engaging means is out of ground engagement and inner leg being operative to move the screw toward said upper position when the ground engaging means engages the ground;
(c) a rotary drive member mounted for rotation relative to the base about the axis of the screw;
(d) means for rotating the drive member;
(e) epicyclic gear means including:
(i) a ring gear rotatable with the drive member;
(ii) a sun gear rotatable with the screw;
(iii) gear carrier means mounted for turning about the axis of the screw;
(iv) intermediate gear means mounted for rotation on the gear carrier means;
(f) first speed control means for stopping rotation of the gear carrier means relative to the base when the screw is in said lower position;
(g) second speed control means for turning the gear carrier means with the drive member when the screw is in the upper position.

15. A jack according to claim 14 wherein the first speed control means includes first abutment means on the gear carrier means engageable with the base when the screw is in said lower position for stopping turning of the gear carrier means, and the second speed control means including second abutment means on the gear carrier means engageable with the drive member when the screw is in the upper position for turning the gear carrier means with the drive member.

16. A jack according to claim 14 including means for moving the gear carrier means downwardly relative to the base when the screw is moved downwardly from the upper position, means for moving the gear carrier means upwardly relative to the base when the screw is moved upwardly from the lower position, the first speed control means including first abutment means on the gear carrier means engageable with the base when the screw is in said lower position for stopping turning of the gear carrier means, the said second speed control means including second abutment means on the gear carrier means engageable with the drive member when the screw is in the upper position for turning the gear carrier means with the drive member.

17. A jack according to claim 14 including means for moving the gear carrier means downwardly when the screw is moved downwardly from the upper position, means for yieldably moving the gear carrier means upwardly when the screw is moved upwardly from the lower position, the first speed control means including first abutment means on the gear carrier means engageable with the base when the screw is in said lower position for stopping turning of the gear carrier means, the second speed control means including second abutment means on the gear carrier means engageable with the drive member when the screw is in the upper position for turning the gear carrier means with the drive member, the second control means for turning the gear carrier means with the drive member also including slip clutch means on the gear carrier means and the drive member for turning the gear carrier means when the first abutment means moves out of engagement with the base and before the second abutment means moves into engagement with the drive member.

18. In a dual jack system having first and second two-speed jacks each including: a tubular outer leg, a tubular inner leg telescopically slidable in the outer leg and having screw follower means on an upper end and ground engaging means at a lower end, a screw having an upper shank and a threaded shaft engaging the screw follower means for extending the inner leg when the screw is rotated in a first direction and for retracting the inner leg when the screw is rotated in a second direction, an upright shaft mounted for rotation about an axis transverse to the screw axes of the first and second jacks, the improvement wherein the first and second jacks each have a screw drive mechanism comprising:

(a) a base fixed to an upper end of the outer leg;

(b) means mounting the shank of the screw on the base for axial rotation of the screw and for limited endwise movement of the screw relative to the base between preselected upper and lower positions; the screw and the inner leg being arranged to move downwardly relative to the outer leg to the lower position when the ground engaging means is out of ground engagement and inner leg being operative to move the screw toward said upper position when the ground engaging means engages the ground;

(c) rotary drive means mounted for rotation relative to the base;

(d) transmission means responsive to rotation of the rotary drive means in one direction and:
  (i) operative when the screw is in said lower position for driving the screw in said first direction at a first number of revolutions for each revolution of the rotary drive means; and
  ii) operative when the screw is in said upper position for driving the screw in a direction at a lower number of revolutions for each revolution of the rotary drive means;

(e) the transmission means being responsive to rotation of the rotary drive means in a second direction and:
  (i) operative when the screw is in said lower position for driving the screw in said second direction at said first number of revolutions for each revolution o the rotary drive means; and
  (ii) operative when the screw is in said upper position for driving the screw in said second direction through said lower number of revolution for each revolution of the rotary drive means; and (f) first and second gear means for drivingly connecting the input shaft to the rotary drive means on the first and second jacks.

19. A dual jack system according to claim 18 including first and second clutch one-way means in the first and second gear means respectively operative when the input shaft is turned to rotate the rotary drive means in said second direction to allow rotation of the input shaft relative to the rotary drive means on either jack when the torque load on the rotary drive means on that jack exceeds a preselected value.

* * * * *